US009256784B1

(12) United States Patent
Taylor et al.

(10) Patent No.: US 9,256,784 B1
(45) Date of Patent: Feb. 9, 2016

(54) EYE EVENT DETECTION

(71) Applicant: Amazon Technologies, Inc., Reno, NV (US)

(72) Inventors: Dennis James Taylor, San Luis Obispo, CA (US); Joshua Daniel Wright, Pismo Beach, CA (US); Jed Baraban Reinitz, Seattle, WA (US); Tommy Lee Bennett, San Luis Obispo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 13/792,953

(22) Filed: Mar. 11, 2013

(51) Int. Cl.
*H04N 13/04* (2006.01)
*G06K 9/00* (2006.01)

(52) U.S. Cl.
CPC ........ *G06K 9/00597* (2013.01); *H04N 13/0484* (2013.01)

(58) Field of Classification Search
CPC .................................................. H04N 13/0484
USPC ......................................................... 382/278
See application file for complete search history.

(56) References Cited

U.S. PATENT DOCUMENTS

| 5,933,526 | A  | * | 8/1999  | Sklarew ........................ 382/189 |
| 8,767,014 | B2 | * | 7/2014  | Vaught et al. ................. 345/633 |
| 8,834,166 | B1 | * | 9/2014  | Ionkov et al. ................. 434/178 |
| 2009/0290753 | A1 | * | 11/2009 | Liu et al. ....................... 382/100 |
| 2011/0184736 | A1 | * | 7/2011  | Slotznick ..................... 704/249 |
| 2011/0201387 | A1 | * | 8/2011  | Paek et al. ..................... 455/566 |
| 2011/0256520 | A1 | * | 10/2011 | Siefert .......................... 434/322 |
| 2012/0001923 | A1 | * | 1/2012  | Weinzimmer et al. ........ 345/473 |
| 2013/0054622 | A1 | * | 2/2013  | Karmarkar et al. ........... 707/749 |
| 2014/0062853 | A1 | * | 3/2014  | Chaudhri et al. ............. 345/156 |
| 2014/0310256 | A1 | * | 10/2014 | Olsson et al. ................. 707/706 |

FOREIGN PATENT DOCUMENTS

EP         2642425 A1 *  9/2013
KR  20080007777 A  *  1/2008

OTHER PUBLICATIONS

Machine translation of foreign documents.*

* cited by examiner

*Primary Examiner* — Stephen R Koziol
(74) *Attorney, Agent, or Firm* — Lee & Hayes, PLLC

(57) ABSTRACT

The techniques and systems described herein track gaze movement of a user while eyes of the user read a document on a computing device. The techniques may then analyze or evaluate the gaze movement to determine if a reading interruption occurs (e.g., a reading pause or irregularity in a regular reading rate for the user). The reading interruption may occur when the user, while reading, encounters or notices a problem in the text. The reading interruption may also occur when the user encounters or notices text that the user has a strong interest in. When the reading interruption occurs, the techniques may evaluate a gaze direction and associate the reading interruption with a text that is currently displayed (e.g., word, sentence, paragraph, page, etc.). Moreover, the techniques may map the displayed text to a location in the document (e.g., a page or other identifiable section), and report the location to a centralized entity where statistical analysis can be performed to determine if there is a problem in the document.

25 Claims, 6 Drawing Sheets

EYE EVENT DETECTION

BACKGROUND

Reading text from electronic documents displayed by computing devices has become more and more popular and convenient. One reason is due to the availability of personal computing devices such as electronic book (ebook) reader device, tablets, smartphones, personal digital assistants (PDAs), laptop computers, netbooks, desktop computers, etc. For example, people can read a book, news articles, or other electronic documents on a portable computing device while riding a bus to work.

Additionally, publishing or distributing electronic documents is more efficient because it removes the cost associated with printing physical copies and it also makes the document more readily available to a group of readers (e.g., via a Uniform Resource Locator (URL), an ebook webstore, etc.). Thus, as a result of development of the Internet and the World Wide Web and personal computing devices, more and more authors of documents are provided with an opportunity to distribute electronic documents.

However, electronic documents may often contain errors and mistakes because the authors may not have the time and resources to proof read the document as they rush to post it online and/or distribute the document to a group of readers. Moreover, a document written in a first language and translated to a second language before distribution may also contain errors and mistakes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
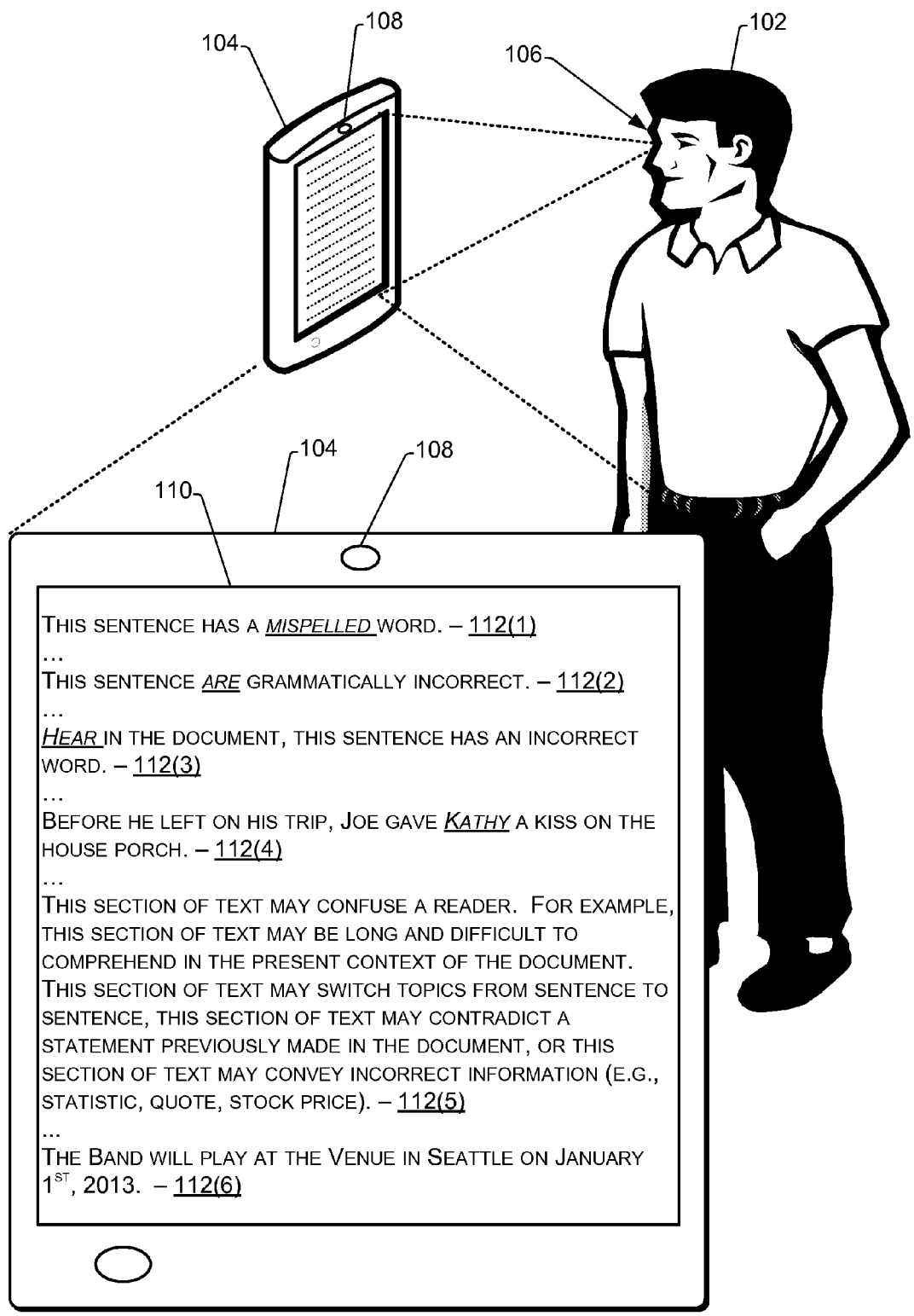
FIG. 1 shows an example overview that tracks eye gaze movement of a user and determines a reading interruption while the user is reading a document on a computing device.

The techniques and systems described herein track gaze movement of a user while eyes of the user read a document on a computing device. The techniques may then analyze or evaluate the gaze movement to determine if a reading interruption occurs (e.g., a reading pause or irregularity in a regular reading rate for the user). The reading interruption may occur when the user, while reading, encounters or notices a problem in the text. The reading interruption may also occur when the user encounters or notices text that the user has a strong interest in. When the reading interruption occurs, the techniques may evaluate a gaze direction and associate the reading interruption with a text that is currently displayed (e.g., word, sentence, paragraph, page, etc.). Moreover, the techniques may map the displayed text to a location in the document (e.g., a page or other identifiable section), and report the location to a centralized entity where statistical analysis can be performed to determine if there is a problem in the document.

The eyes of a user often pause or slow down at a particular reading location when the user notices a problem in the displayed text of an electronic document (e.g., a typographical error, a grammatically incorrect phrase, etc.). In other words, the user's regular reading rate (e.g., speed, efficiency) may experience an interruption or irregularity, perhaps because the user may re-read the word or phrase (e.g., group of words, sentence, paragraphs, etc.) for clarification or verification. In another example, the user's regular reading rate may experience an interruption or irregularity when the user encounters or notices other problems in the displayed text of the electronic document, such as a word or a phrase that is confusing or out of context. In yet another example, a user's regular reading rate may experience an interruption or irregularity when the user encounters or notices text that he or she has a strong interest in, and therefore, wants to re-read the text. Each of the example scenarios where the user's regular reading rate experiences an interruption or irregularity, may result in the determination of a reading event of interest.

Accordingly, the techniques described herein may implement actions in response to detecting a reading event of interest based on tracking eye gaze movement while the user is reading. In various embodiments, the techniques may collect reading event information from multiple different readers of the same document to determine whether or not the document contains a problem at a particular location (e.g., page or other identifiable section of the document), from which corrective actions may be implemented. The corrective actions may include, but are not limited to, automatically correcting the problem and/or notifying an author or other person responsible for the document (e.g., editors, publishers, writers, bloggers, journalists, reporters, or others responsible for the text in the document, etc.) that a document location may include text that is problematic. This will provide the author or the other person with an opportunity to evaluate the text and correct any errors, mistakes and/or confusing text contained therein. In other embodiments, the techniques may collect reading event information that is personal to a user so that the techniques can identify interests of the user and provide personal recommendations based on identified interests (e.g., advertisements, products, coupons, offers, etc.).

As discussed herein, a document may be a book, a novel, a short story, news article (e.g., world news, local news, financial news, sports news, entertainment news, political news), a magazine article, an academic paper (e.g., research document, experiments, algorithms, equations, computer code, etc.), an educational text book, a screenplay, or any other type of electronic document published and/or made available for download (e.g., via a network, Universal Serial Bus (USB) connection, etc.) to an electronic device that supports electronic reading. Moreover, in at least one embodiment, the document may be a self-published document made available to others by an author who does not have the resources (e.g., time, money, etc.) to provide a thorough proof-read of the document which would likely identify any problems before the document is distributed to others. In other embodiments, the document may be an automatic translation of a document written in a different language, and therefore, the document may contain the aforementioned problems as a result of the translation. In some instances, the document may also include an embedded image, a set of images, or a video.

Thus, the techniques discussed herein can determine that a reading event of interest has occurred, can associate the reading event of interest with displayed text, and can map the displayed text to a location in the document that may possibly contain a problem or an interest of a user reading the document. In some embodiments, the techniques may determine other reading events of interest independent of eye gaze movement. The text of the document may contain alphanumeric characters and common punctuation. The term "techniques" used herein, for instance, may refer to system(s), method(s), computer-readable instructions, algorithms, components, modules, and/or models as permitted by the context above and throughout this document.

Example Overview

FIG. 1 shows an example overview of an environment in which the techniques described herein may be implemented. As mentioned above, due to the convenience and expanding availability of computing devices and network access, more and more users are switching from reading physical copies of documents (e.g., printed newspapers and printed books) to reading electronic documents using a computing device (e.g., a personal computing device). Thus, FIG. 1 shows a user 102 reading or viewing a document on a computing device 104. Moreover, FIG. 1 shows the eyes 106 of the user 102. An eye sensor device 108 may collect (e.g., capture images of at least a portion of the eyes) information related to a gaze direction of the eyes 106 as the user reads. Based on a change in gaze direction from one image to the next, eye gaze movement can be tracked, and a reading event of interest can be identified.

FIG. 1 also shows a front view of the computing device 104. The computing device 104 may include the eye sensor device 108 (e.g., a front-facing camera, motion sensor, etc.), or alternatively the computing device 104 may in some way be coupled to the eye sensor device 108. The eye sensor device 108 is configured to collect information about the eyes 106 and/or capture images of the eyes 106 while the user 102 is reading text that is a portion of an electronic document currently being presented on a display 110 of the computing device 104. The computing device 104 and/or the eye sensor device 108 may then use the collected information about the eyes 106 and/or the captured images of the eyes 106 to track the user's eye gaze movement and identify displayed text that are associated with a reading event of interest.

For instance, FIG. 1 illustrates multiple examples 112(1) . . . 112(6) that may cause the user's regular reading rate to experience an interruption or irregularity. In the first example 112(1), the computing device 104 and/or the eye sensor device 108 may determine that a reading event of interest occurs when the eyes 106 of the user 102 encounter displayed text that includes a misspelled word, e.g., "mispelled". In the second example 112(2), the computing device 104 and/or the eye sensor device 108 may determine that a reading event of interest occurs when the eyes 106 of the user 102 encounter displayed text that includes a grammatically incorrect statement, e.g., "This sentence are grammatically incorrect." In the third example 112(3), the computing device 104 and/or the eye sensor device 108 may determine that a reading event of interest occurs when the eyes 106 of the user 102 encounter displayed text that includes a misuse of a homonymous word, e.g., "hear" when the correct word is "here". While the examples provided above are each associated with typographical and/or grammatical errors, the techniques may also determine reading events of interest associated with other types of problems.

For instance, the fourth example 112(4) may be associated with character confusion. That is, "Kathy" may actually not be the wife of "Joe" in the context of the document the user 102 is currently reading. Rather, Joe's wife may actually be "Sally", and Kathy may actually be a character in the document that works with Joe and is fond of him. Thus, there is no reason Joe should be kissing Kathy, but rather Joe should be kissing Sally on the house porch. This may be an author mistake that the author failed to realize before publishing or posting the document for distribution. Accordingly, the computing device 104 and/or the eye sensor device 108 may determine that a reading event of interest occurs when the eyes 106 of the user 102 encounter a confusing phrase or statement. Here, the eyes 106 of the user 102 may pause or slow down in order to re-read the displayed text in example 112(4) and gain clarity.

The fifth example 112(5) provides an example paragraph that may also confuse a reader. The paragraph may be long and difficult for the user 102 to comprehend in the context of the document. Moreover, the paragraph may switch topics from sentence to sentence, contradict a statement previously made elsewhere in the document, or convey incorrect information altogether. Again, the computing device 104 and/or the eye sensor device 108 may determine that a reading event of interest occurs when the eyes 106 of the user 102 encounter the example paragraph because the user's reading may pause to re-read the displayed text in order to make sense of the paragraph.

Accordingly, the regular reading rate of the user 102 may experience an interruption or irregularity while reading the examples 112(1) . . . 112(5) provided above because portions of the displayed text may contain general problems, errors, mistakes, and/or confusion. The techniques discussed herein can correlate the reading event of interest to text currently displayed on the computing device 104 and then map the displayed text to a location in the document so that corrective actions may be implemented.

Additionally, example 112(6) provides text that may not be associated with any type of problem, but nonetheless, the regular reading rate of the user 102 may still experience an interruption or irregularity. For example, assume the text in example 112(6) is part of a concert review article. The concert review article may provide feedback on multiple different bands and artists in a particular music genre, and the article may also discuss tour performance dates for the multiple different bands and artists. Generally, systems may know that the user is interested in the broad concert review article and the music genre once the user clicks on, or downloads, the article. However, the general systems are unable to determine or distinguish a degree of user interest within the article. The techniques discussed herein may determine that a reading event of interest occurs when the user 102 pauses or re-reads (e.g., focuses on) the statement that "The Band will play at the Venue in Seattle on Jan. 1, 2013." Accordingly, the techniques can discern that the user has a stronger interested in the "Band" compared to the other band or artists mentioned in the article. The techniques can then use this detection as an opportunity to provide a recommendation to the user. For example, the recommendation may include an advertisement for tickets to the show so the user can see the Band play live. Or the recommendation may include a coupon for food and drinks at restaurants or bars in proximity to the Venue on Jan. 1, 2013.

In an alternative example that determines a reading event that may indicate a strong user interest, the user 102 may pause or re-read text in a book or travel guide that describes the beauty of a particular place or landmark (e.g., the Eiffel Tower, Machu Picchu, the Egyptian pyramids, etc.). Thus, the techniques can provide recommendations directed to traveling to the particular place or landmark (e.g., airfare, hotels, etc.). The recommendations may be provided to and displayed on the computing device 104 while the user 102 is reading the document, or at a later time when the user 102 is accessing different content on the computing device 104 after already reading the document.

Illustrative Device

Figure 2:
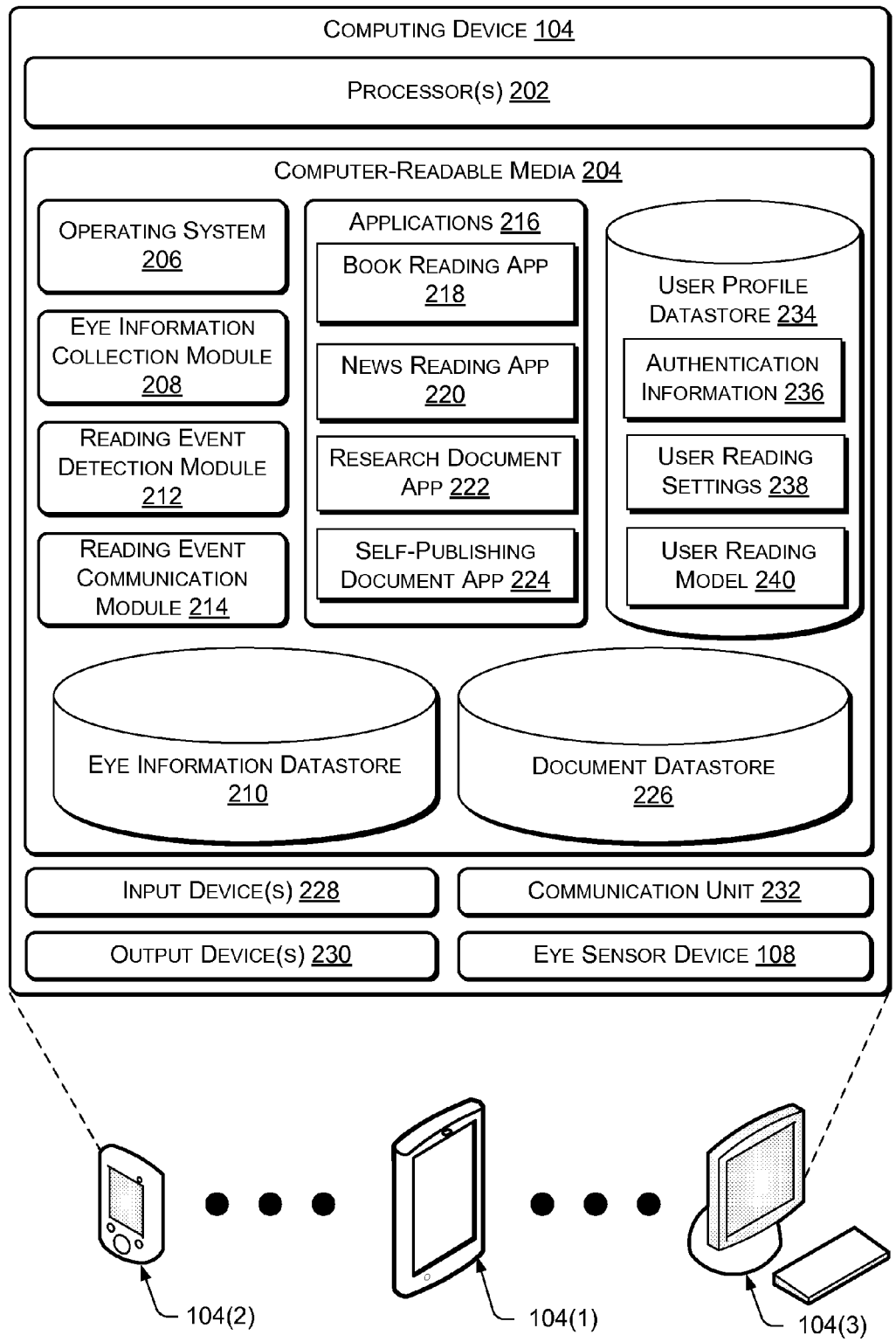
FIG. 2 shows a functional diagram of selected components implemented at a computing device.

FIG. 2 shows selected functional components of the computing device 104 that supports electronic reading. The computing device 104 may be implemented as an ebook reader device 104(1) where the primary use is book reading (e.g., the user 102 reads a book by flipping through or scrolling through different pages of the book). Ebook reading devices may also be able to download and/or display other documents as well (e.g., online news articles, self-published documents, etc.). The computing device 104 may also be implemented as a smartphone 104(2), a personal computer 104(3), or any other computing device capable of downloading, storing and/or displaying document text, such as tablets, PDAs, laptop computers, netbooks, notebooks, etc. Thus, the illustrated devices 104(1), 104(2), and 104(3) are merely provided as examples and not intended to be limiting, as the techniques described in this disclosure may be implemented by any computing device capable of downloading, storing and/or displaying document text.

In the illustrated implementation, the computing device 104 includes one or more processors 202 and computer-readable media 204. The computer-readable media 204 may include volatile and nonvolatile memory, removable and non-removable media implemented in any method or technology for storage of information, such as computer-readable instructions, data structures, program modules, or other data. Such memory includes, but is not limited to, random access memory ("RAM"), read-only memory ("ROM"), electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, redundant array of independent disks ("RAID") storage systems, or any other medium which can be used to store the desired information and which can be accessed by a computing device. The computer-readable media 204 may be implemented as computer-readable storage media ("CRSM"), which may be any available physical media accessible by the processor(s) 202 to execute instructions stored on the memory. In one basic implementation, CRSM may include RAM and Flash memory. In other implementations, CRSM may include, but is not limited to, ROM, EEPROM, or any other tangible medium which can be used to store the desired information and which can be accessed by the processor(s) 202.

Several modules, datastores, and so forth may be stored within the computer-readable media 204 and configured to execute on, or by, the processor(s) 202. A few example functional modules are stored in the computer-readable media 204 and executed on the processor(s) 202, although the same functionality may alternatively be implemented in hardware, firmware, or as a system on a chip (SOC).

An operating system module 206 may be configured to manage hardware and services within and coupled to the computing device 104 for the benefit of other modules. As further discussed herein, an eye information collection module 208 may be configured to receive and/or collect eye information (e.g., captured images) from the eye sensor device 108 and store the eye information in an eye information datastore 210. A reading event detection module 212 may then be configured to analyze the stored eye information to track eye gaze movement and determine whether a reading event of interest occurs in the eye gaze movement as the user reads displayed text. If a reading event of interest occurs, in various embodiments, a reading event communication module 214 may communicate the reading event of interest to another entity as discussed with respect to FIG. 3.

FIG. 1 and FIG. 2 show an embodiment where the eye sensor device 108 is part of, or built into, the computing device 104. However, in alternative embodiments, the eye sensor device 108 may be removed, or separated, from the computing device 104. In the alternative embodiments, the eye sensor device 108 may be coupled to the computing device 104 so that the eye information can be communicated from the eye sensor device 108 to the computing device 104 for storage in the eye information datastore 210.

In various embodiments, the eye sensor device 108 may be a front-mounted device that is configured to collect eye information about the eyes 106 and/or capture images of the eyes 106 of the user 102 while the user 102 is viewing the display 110. Thus, a current eye gaze direction of the user can be discerned at a particular point in time. FIG. 1 illustrates that a single eye sensor device 108 is located on the top of the computing device. However, in alternative embodiments, the eye sensor device 108 may be placed on the sides, corners, and/or bottom of the computing device 104, and there may be multiple (e.g., two, three, four) eye sensor devices 108 that work together to collect and capture eye information. The eye sensor device 108 may comprise, for example, a camera, a charge-coupled device (CCD), a motion detection sensor, an infrared sensor, or a device configured to utilize any other appropriate technology capable of directly or indirectly tracking movement of the eyes 106 of the user 102. The eye sensor device 108 collect the eye information that can be tracked to determine eye gaze movement, as well as an eye gaze direction, as the user reads an electronic document (e.g., continuous imaging, periodic imaging, image streaming, etc.).

The eye information collection module 208 may receive and store the eye information collected and captured by the eye sensor device 108 in the eye information datastore 210. Then, the reading event detection module 212 can analyze and evaluate, using one or more eye gaze tracking algorithms, the eye information (e.g., sequential images) to determine time-varying eye gaze movement (e.g., a change in eye gaze direction) that may include an x-displacement component (e.g., left and right eye movement) and/or a y-displacement component (e.g., up and down eye movement). As further discussed herein, the reading event detection module 212 may consider the time-varying eye gaze movement in light of a user's regular reading rate. Therefore, the reading event detection module 212 can identify reading events of interest (e.g., an interruption or an irregularity to regular or normal reading). For example, the reading event detection module 212 may determine that a user interrupted regular eye gaze movement when the eye gaze movement re-reads a paragraph (e.g., the eye gaze direction would move up the page opposed to down the page).

In various embodiments, the computing device 104 and/or the eye sensor device 108 may also be configured with functionality that determines where the user is, and where the user's eyes 106 are (e.g., a retinal reflection or a pupil/iris position), relative to the computing device 104 (e.g., distance from, angle to, etc.) so that calibration can be performed and tracking eye gaze movement may be more accurate. Additional information about eye gaze detection may be found, for example, in co-pending U.S. patent application Ser. No. 13/076,308, filed on Mar. 30, 2011, and entitled "Secure Device Unlock with Gaze Calibration, which is hereby incorporated by reference.

To enable electronic document reading functionality, the computing device 104 may include a plurality of applications 216 stored in the computer-readable media 204 or otherwise accessible to the computing device 104. At least some of the applications 216 may enable document purchase (e.g., ebook webstore) or document access (e.g., downloading via the Internet, World Wide Web, USB or other connections). For example, the applications 216 may include an ebook reading application 218, a news reading application 220, a research document application 222, a self-publishing document application 224, and so forth. Accordingly, each of the aforementioned applications may access, download and store documents (e.g., the document content) and document profiles (e.g., document metadata) in a document datastore 226.

In various embodiments, the computing device 104 includes input devices 228 and output devices 230. The input devices 228 may include a keyboard, keypad, mouse, touch screen, joystick, control buttons, scrolling buttons, page flipping buttons, microphones, etc. The output devices 230 may include the display 110 (e.g., touch screen, liquid crystal display (LCD), etc.), speakers, or the like.

The computing device 104 may also include a communication unit 232 to facilitate a wired and/or wireless connection to a network or other devices. Therefore, the communication unit 232 may implement one or more of various wired and/or wireless technologies, such as a Wi-Fi communications, Bluetooth communications, radio frequency (RF), USB communications, a broadband connection, optical port, Ethernet, or any other acceptable communications protocol.

The reading event detection module 212 is configured to determine a reading event of interest based on an analysis and evaluation of the eye information stored in the eye information datastore 210. In at least one embodiment, the reading event detection module 212 may determine a reading event of interest based on a general reading interruption or reading irregularity that may be clear and apparent without considering the user's individual regular reading rate.

In other embodiments, the reading event detection module 212 may analyze and evaluate the user's current eye gaze movement in light of, or while considering, a user's individual regular reading rate. The reading event detection module 212 may access this information because reading interruptions and irregularities may be different for different users because readers have different reading patterns and habits. Therefore, the computer-readable media 204 may contain a user profile datastore 234 that contains information for one or more different users of the computing device 104. The user profile datastore 234 may contain authentication information 236 that validates a user log-in (e.g., user identification and password) so that the computing device 104 knows which of multiple users is reading an electronic document. The user profile datastore 234 may store user reading settings 238 for each user. The user reading settings 238 may include preferred formatting for the document text (e.g., font, text size, line spacing, character spacing, word spacing, etc.). The user profile datastore 234 may also contain one or more reading models 240 for each user. The reading model 240 may be developed and updated over time based on the tracked eye gaze information of a particular user from previous document readings. Therefore, the reading model 240 may reflect a user's regular reading rates and may be built based on reading characteristics, such as speed of eye movement, average time to read a line, average time to read a page, efficiency, reading level, an age of a user, an expertise of user, and so forth. The techniques may develop the reading model 240 by considering information that indicates when the user is reading and when the user is not reading (e.g., set the computing device 104 down, hit a pause button to stop reading, etc.).

In some embodiments, the reading model 240 is trained to incorporate the preferred reading settings 238 (e.g., font, text size, line spacing, character spacing, word spacing, etc.) when determining a user's regular reading characteristics. In further embodiments, the reading model 240 may also consider user variances for particular types of documents (e.g., novel vs. news article) and a complexity level for the documents (e.g., children's book vs. scientific research paper).

Accordingly, the reading event detection module 212 may access the user reading settings 238 and/or the user reading model 240 when analyzing and evaluating eye gaze movement based on the eye information in the eye information datastore 210. That is, the reading event detection module 212 may compare the currently tracked eye gaze movement to a regular reading rate defined in the user reading model 240 to determine if a reading event of interest has occurred (e.g., an interruption or an irregularity to a user's regular or normal reading rate). This reading event of interest may be associated with a problem in the text or a user interest, as discussed with respect to FIG. 1.

In various embodiments, the reading event detection module 212 may also determine other reading events of interest independent of eye gaze movement. For example, the reading event detection module 212 may determine that the user stops reading displayed text that is mapped to a particular page or a particular chapter of the document (e.g., the user closes the document or turns off the computing device 104). Moreover, the reading event detection module 212 may determine that the user fails to continue reading the document after the page or chapter where the user stops reading (e.g., the user does not load the document for reading again within a time threshold such as a week or a month). Accordingly, reading events other than events based on eye gaze movement may be determined and the reading event communication module 214 may communicate the reading events to another entity as discussed with respect to FIG. 3.

In some instances, the reading event detection module 212 may discern the type of problem in the text based on the tracked eye gaze movement. For example, an eye gaze interruption or irregularity associated with a misspelled word, such as example 112(1), is likely a shorter pause compared to an eye gaze interruption or irregularity associated with a long and confusing paragraph, such as example 112(5). Thus, the eye gaze detection module 212 may track how long the eyes 106 of the user 102 are focused on particular text based on the determined eye gaze direction.

In various embodiments, when determining whether a reading event of interest occurs, the reading event detection module 212 may also access document metadata for the particular document being viewed or read by the user 102. For example, document metadata may be stored in the document datastore 226 and may indicate a type of document and a reading complexity level, e.g., a low complexity level for a romantic novel versus a high complexity level for a scientific research publication. Moreover, the document metadata may also include average reading statistics compiled based on others' readings of the document, such as average total reading time, average page reading time, average age of user reading the document, recommended expertise level, etc.

Therefore, the reading event detection module 212 is able to consider different types of information (e.g., user information and document information) when determining that a reading event of interest occurs while the user is reading a document. In various embodiments, after determining that a reading event of interest has occurred, the reading event detection module 212 may correlate the event with the text displayed, or a portion of the text displayed (e.g., where the user was looking when the event occurred based on gaze direction). The reading event detection module 212 may then map the displayed text to a location within the document, and store the location information on the computing device 104 for further use. For example, depending on the user settings 238 and a screen size, the computing device 104 may display text on a different page compared to other devices or compared to a central copy of the document. Thus, the text displayed when the reading interruption occurs may be mapped to a location or a coordinate in a standard formatted version of the document.

Depending on the eye sensor device 108 used and the eye gaze tracking algorithms employed, the accuracy in correlating the reading event with a portion of text displayed, may vary. For example, the reading event detection module 212 may correlate the gaze direction to a displayed pixel on the screen, a sub-pixel, a character, a word, a sentence, a paragraph, a page, and so forth. In some embodiments, the correlation accuracy may depend on a minimum text size, minimum line spacing, and so forth.

The reading event detection module 212 may store the mapped location information, as well as other information about the reading event (e.g., length of interruption) in association with a document identifier, and the reading event communication module 214 may then report or communicate the reading event of interest to another entity. In some embodiments, the reading event communication module 214 may communicate all the text displayed on the computing device 104 when the reading interruption occurs.

Illustrative Architecture

Figure 3:
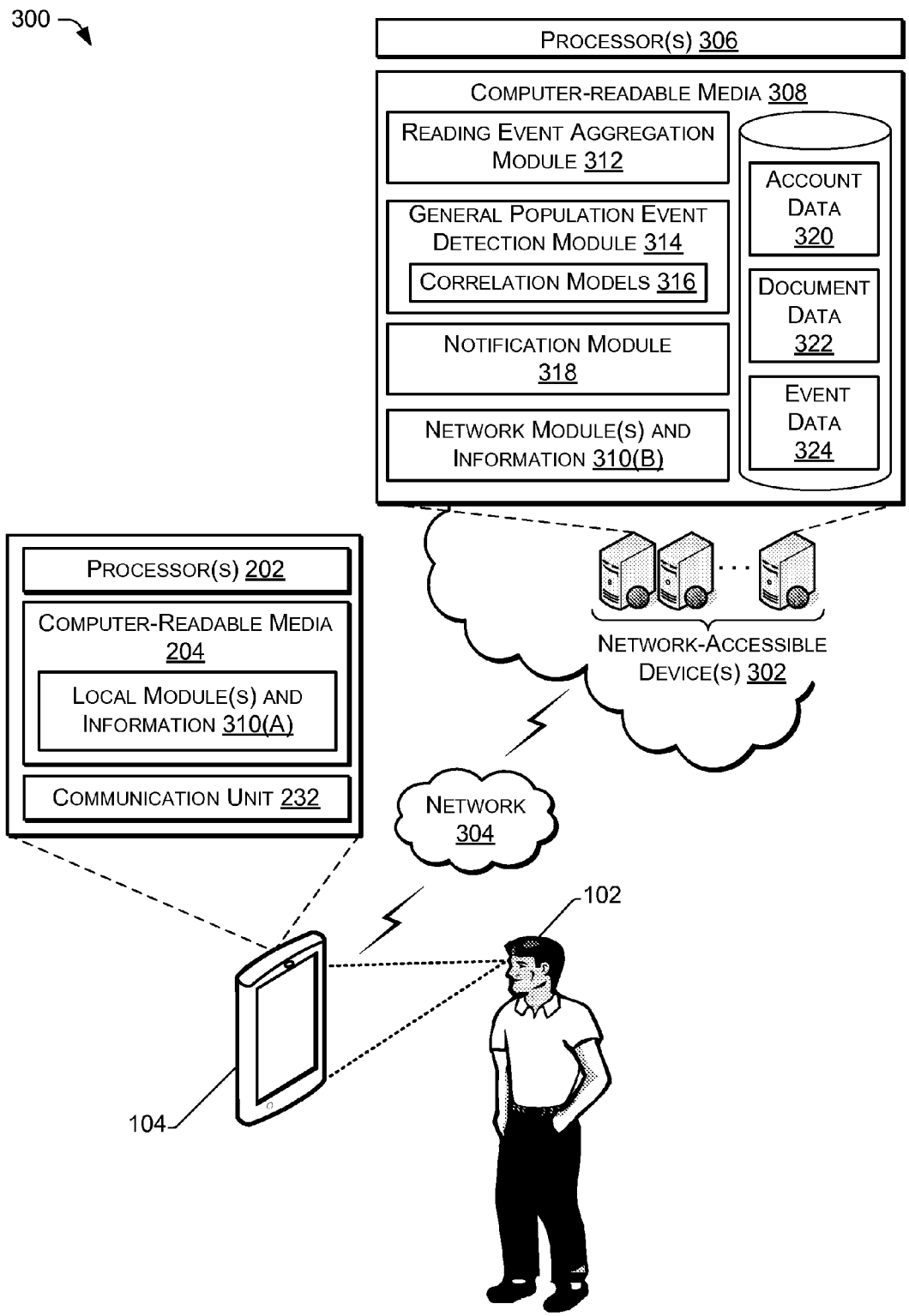
FIG. 3 shows a functional diagram of selected components implemented at a computing device and services accessible via a network.

FIG. 3 is a system architecture 300 showing an implementation where the computing device 104 communicates, via the communication unit 232, with another entity, such as network-accessible devices 302 that may be part of cloud services. Cloud services generally refer to a network accessible platform implemented as a computing infrastructure of processors, storage, software, data access, and so forth that is maintained and accessible via one or more networks 304 such as the Internet. Cloud services may not require end-user knowledge of the physical location and configuration of the system that delivers the services. Common expressions associated with cloud services include "on-demand computing", "software as a service (SaaS)", "platform computing", "network accessible platform", and so forth.

The network-accessible devices 302 may be servers, and therefore, may include one or more processors 306 and computer-readable media 308. The processor(s) 306 and the computer-readable media 308 of the network-accessible devices 302 are physically separate from the processor(s) 202 and computer-readable media 204 of the computing device 104, but may function jointly as part of a system that provides processing and memory in part on the computing device 104 and in part on the cloud services, for example. These network-accessible devices 302 may be arranged in any number of ways, such as server farms, stacks, and the like that are commonly used in data centers.

The modules, applications and datastores illustrated on the computing device 104 in FIG. 2, are collectively referred to as local module(s) and information 310(A) in FIG. 3. Thus, FIG. 3 illustrates an implementation where some of the functional modules, applications and datastores of the computing device 104 may optionally be provided by the cloud services, as illustrated by corresponding network module(s) and information 310(B) on the network-accessible devices 302. In this implementation the computing device 104 and the network-accessible devices 302 may work together to perform the functionality described above. For example, in one embodiment, the analysis and evaluation of the eye information may be performed by the reading event detection module 212 in the cloud rather than on the computing device 104. Thus, the specific location of the respective modules used to implement the features contained in this disclosure is not limiting and the discussions below are equally applicable to any implementation that includes a local device, a cloud-based service, or combinations thereof.

Furthermore, in various embodiments, the computer-readable media 308 of the network-accessible devices 302 may include a reading event aggregation module 312, a general population event detection module 314 with one or more correlation models 316, and/or a notification module 318. The computer-readable media 308 of the network-accessible devices 302 may also include account data 320, document data 322, and/or reading event data 324.

In various embodiments, the network-accessible devices 302 may be part of an account-based entity that provides services and/or content. Accordingly, the account data 320 may be associated with the user 102 who purchases and/or downloads documents maintained by the account-based entity or accessible by the account-based entity via a third party entity. Thus, the account data 320 may include some or all of the information stored in the user profiles 234, as well as other account information (e.g., name, address, payment type, registered devices, demographic information, etc.). The document data 322 may include documents that the account-based entity makes available for distribution to those with an account, or others that may access the account-based entity to access a document. As mentioned above, the document data 322 may include ebooks, novels, short stories, whole periodicals or individual news articles, magazines or magazine articles, academic or research papers, educational text books, screenplays, self-published documents, or any other type of electronic document published and/or made available for download via network-accessible devices 302.

In various embodiments, the reading event aggregation module 312 collects and aggregates different reading events of interests from multiple different users for multiple different documents (e.g., over a period of time). For example, the reading event communication module 214 on the computing device 104 may communicate, over networks 304, reading events to the reading event aggregation module 312. The reading event aggregation module 312 may then sort the events based on a document identifier, so that reading events associated with the same document read by multiple different users are grouped.

In various embodiments, once the reading events are grouped, the general population event detection module 314 employs one or more correlation models 316 to perform statistical analysis on the grouped events for a document and determine whether the document contains one or more locations (e.g., pages or other identifiable sections) that likely contain a problem (e.g., typographical error, grammatically incorrect sentence, confusing paragraph, character confusion, incorrect information, etc.). The general population event detection module 314 correlates different events from multiple different readers of the same document because an interruption or irregularity associated with an individual user's eye gaze movement may not be reliable when determining whether a problem exists. For example, an individual user's regular reading rate may experience an interruption or irregularity due to something other than a problem with the text (e.g., user had to re-read a paragraph because he/she was daydreaming, re-reading because of a personal interest as discussed above with respect to example 112(6), etc.). However, if multiple different users each experience a reading interruption or irregularity at the same location, then there is likely a problem with the text.

Accordingly, the correlation models 316 may use a problem detection threshold or other decision criteria to correlate different reading events from multiple users and determine if the document likely contains problem locations. For example, the problem detection threshold may define that at least a particular percentage (e.g., 50%, 75%, %90) of the users that read the document have to experience a reading interruption at a particular location. In this example, the network-accessible devices 302 may track or be provided with information indicating a number of readers of the document, regardless of whether a reading interruption is reported. In another example, the problem detection threshold may define that a problem likely exists at a location after a pre-determined number (e.g., ten, twenty, fifty, one hundred) reading interruptions from different readers are correlated to the location.

After the general population event detection module 314 detects a general population reading event, it may store the general population event and its corresponding location in the event data 324, and instruct the notification module 318 to report the possibility of an error or a problem to the author of the document or other person responsible for the document. Accordingly, the notification module 318 may access the author's information in the document data 322 and send a communication to the author of the document indicating a location of the possible error or problem. In response, the author can respond with a corrected and modified version of the document that addresses the error or problem, and the corrected and modified version may then replace the older document in the document data 322.

In various embodiments, the general population event detection module 314 may detect the type of the problem, and the notification module 318 may communicate the type of the problem in the communication to the author. For example, if a group of readers spend a considerable amount of time re-reading a particular paragraph, the general population event detection module 314 may determine that detected reading event is not associated with a mere typographical error, but rather, the reading event is more likely to be associated with a confusing paragraph.

In alternative embodiments, the general population event detection module 314 may automatically correct the problem or error (e.g., correct a misspelled word) without communicating a notification to the author.

In various embodiments, the reading event detection module 212, whether located on the computing device 104, the network-accessible devices 302, or a combination thereof, may communicate and/or provide a recommendation in response to detection of a reading event indicative of a user interest. For example, as discussed above with respect to example 112(6) in FIG. 1, some reading interruptions and irregularities may be associated with a strong interest of the user 102 in the text being read. In some embodiments, a reading event can be determined to be a strong user interest if it is determined to be an outlier event (e.g., not a problem with the text). In other embodiments, a reading event can be determined to be a strong user interest by automatically parsing, locally on the computing device 104 or in the cloud, the text to see if an error or problem is likely in the text. If not, the reading event detection module 212 may identify the particular interest of the user and provide a recommendation (e.g., an advertisement, a coupon, an offer, etc.), or provide a recommendation at some point in the future.

The operations of the computing device 104 in FIG. 1, FIG. 2 and/or the system architecture 300 in FIG. 3 are described in additional detail with regard to FIGS. 4-6 below.

Illustrative Processes

Figure 4:
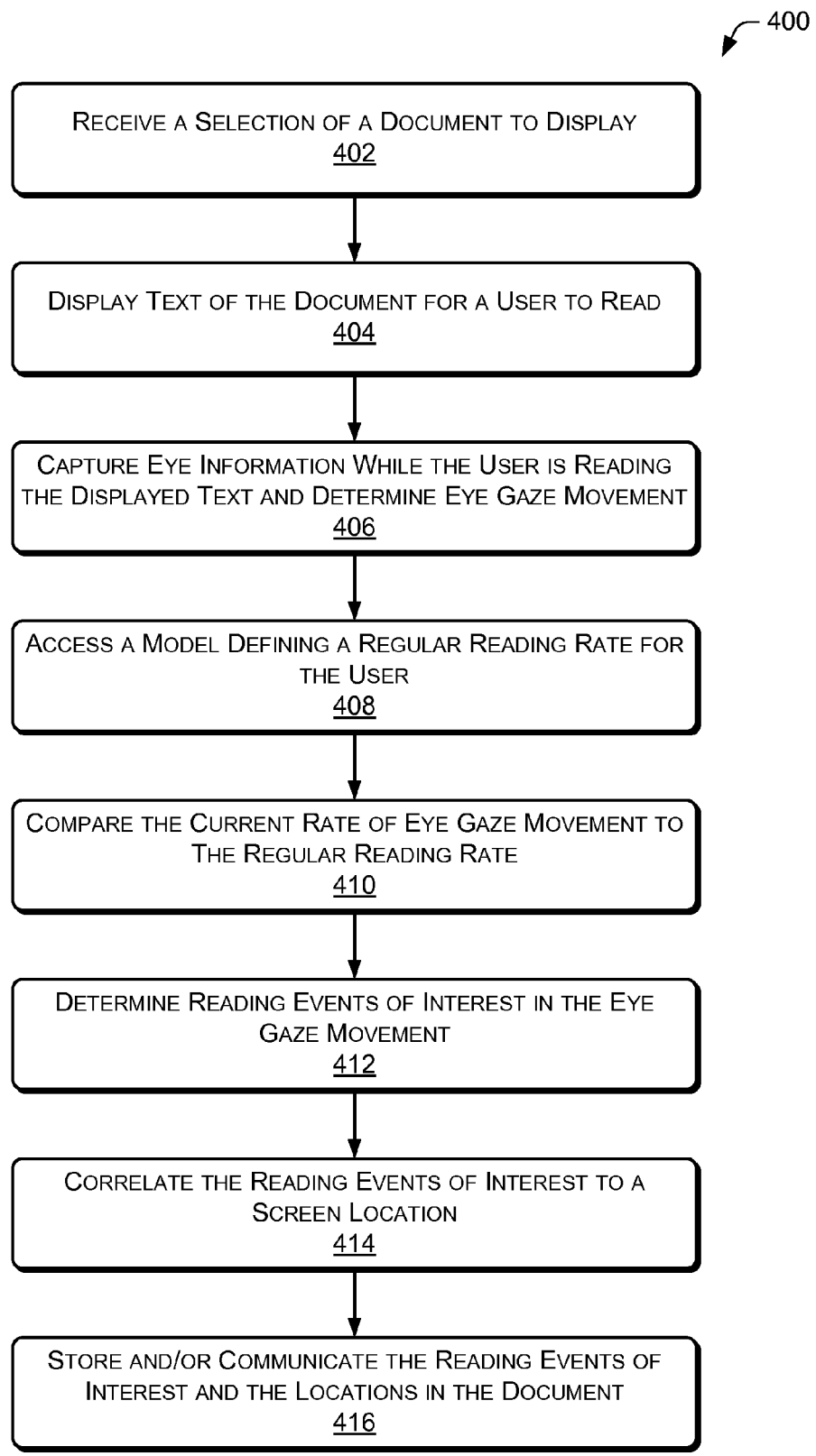
FIG. 4 shows an example process that detects a reading interruption at a computing device.
Figure 5:
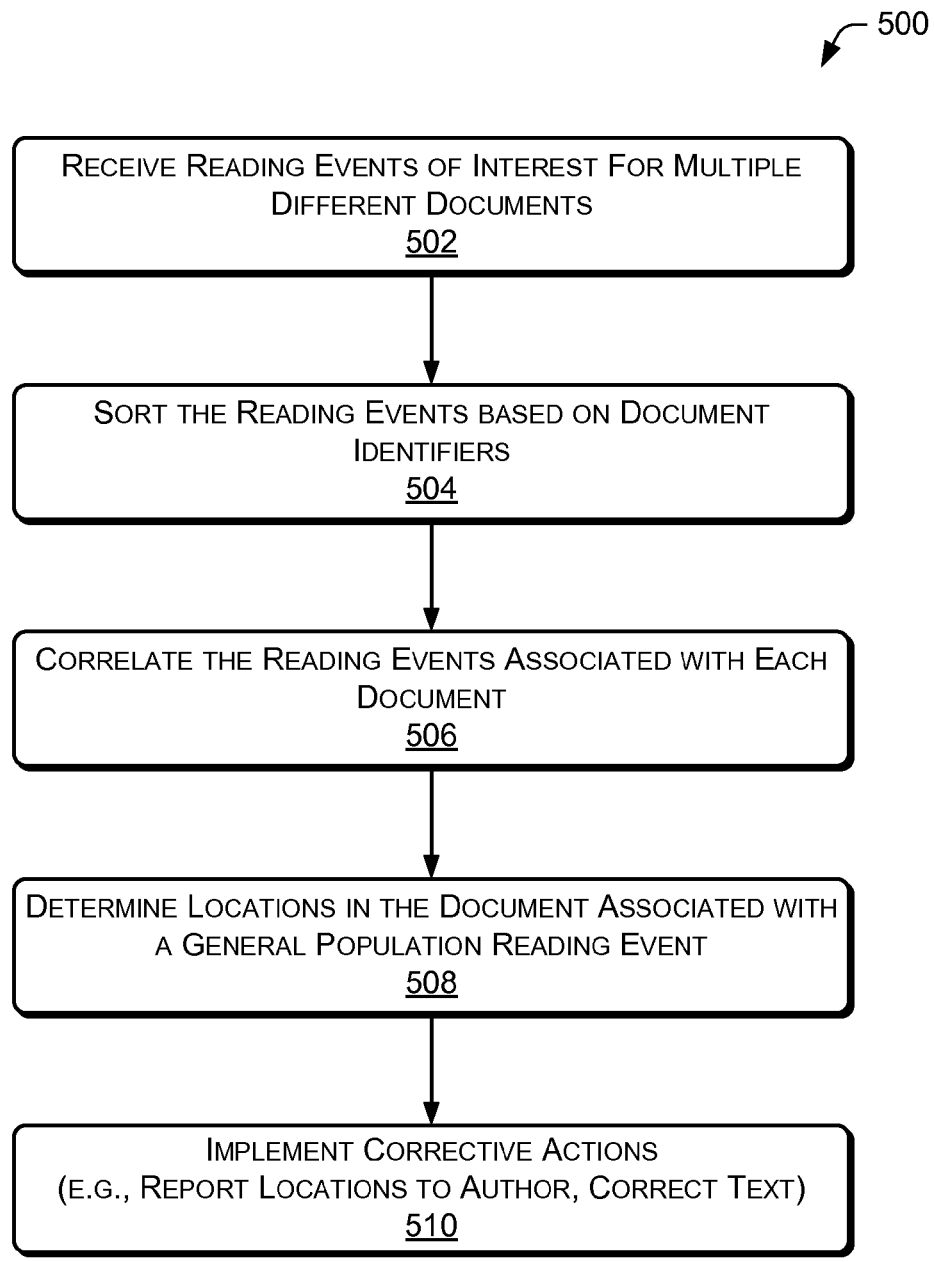
FIG. 5 shows an example process that receives, at a network entity, reading interruptions from multiple different readers of a document.
Figure 6:
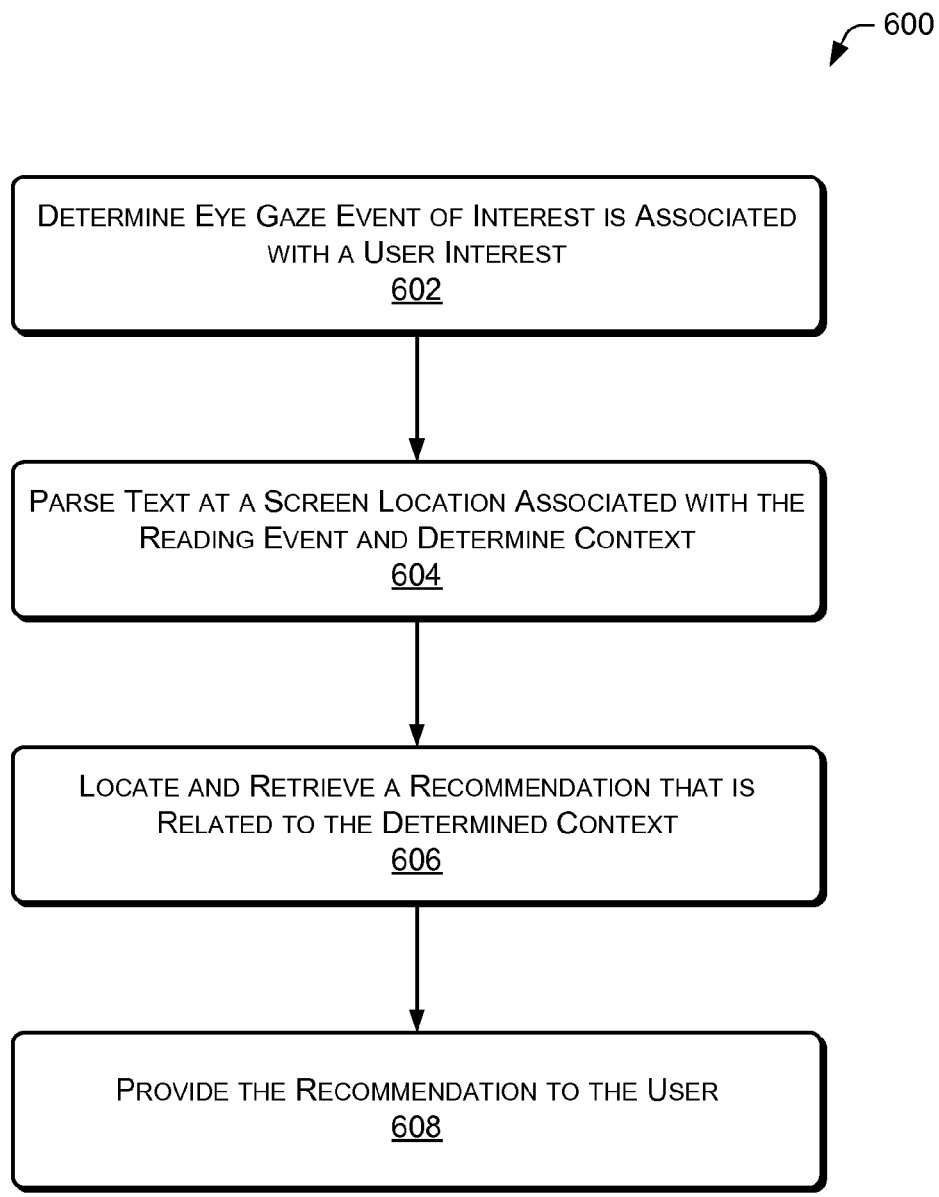
FIG. 6 shows an example process that provides a user with a recommendation based on a determination of a reading interruption.

The processes illustrated in FIGS. 4-6 and described herein are organized as a collection of blocks or actions in logical flow graphs. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 4 shows an example process 400 illustrating tracking eye gaze movement and the detection of a reading event of interest. The process 400 may be implemented by the computing device 104, the eye sensor device 108, and/or the network-accessible devices 302, or by other devices.

At 402, the computing device 104 receives a selection, e.g., from a user 102, of a document that the user 102 is interested in reading. In various embodiments, the computing device 104 may then download the document from a network location (e.g., via a URL). In alternative embodiments, the computing device 104 may already store the document content locally.

At 404, the computing device 104 displays text of the document for the user to read. In some embodiments, the computing device 104 displays the text in accordance with user reading settings 238. As discussed above, the user 102 may then begin reading the document content displayed. Moreover, the user 102 may scroll through the document content or flip electronic pages of the document as the user 102 completes reading the currently displayed text.

At 406, the eye sensor device 108 that is part of the computing device 104, or coupled to the computing device 104, locates the eyes 106 of the user 102 before the user starts reading or shortly after the user starts reading, and collects eye information and/or captures eye images while the user 102 is reading the text currently displayed at the computing device 104. The eye sensor device 108 collects eye information and/or captures eye images over time (e.g., continuous imaging, periodic imaging, etc.). The eye information collection module 208 may then receive the eye information and images from the eye sensor device 108, and the reading event detection module 212 may determine time-varying eye gaze movement by evaluating the eye information (e.g., images captured by a camera, etc.). In various embodiments, the eye gaze movement is tracked by determining a change in eye gaze direction.

At 408, the reading event detection module 212 may access the user reading model 240. As discussed above, the user reading model 240 may define a regular reading rate for the user based on historic reading characteristics (e.g., the user reading model 240 may be built over time).

At 410, the eye gaze event detection module 212 may compare a current rate of the eye gaze movement, tracked while the user 102 is reading the displayed text, to the regular reading rate defined in the user reading model 240.

At 412, the reading event detection module 212 determines reading events of interest in the eye gaze movement based on the comparison in 410. For example, a reading event of interest may occur when the current rate of eye gaze movement is a threshold percentage (e.g., 50%, 70%) less than the regular rate of eye gaze movement. The reading interruption or irregularity may occur when a reader encounters or notices a problem in the text, such as a typographical error, a grammatically incorrect phrase or sentence, or a confusing phrase or paragraph. In another example, the reading event of interest may be a reading interruption or irregularity that results when a reader encounters content that he or she has a strong interest in.

In various embodiments, the reading event detection module 212 reading events of interest without accessing a user model and making a comparison. For example, the reading event detection module 212 may track the eye gaze movement and determine, based on eye gaze direction, when a user re-reads a paragraph of displayed text. This may be determined independent of making a comparison to a regular reading rate of the user.

At 414, the reading event detection module 212 may correlate the reading events of interest to a particular location on the display screen (e.g. where the eyes 106 of the user 102 were focused when the interruption or irregularity occurred). In various embodiments, the reading event detection module 212 may perform the correlation by determining eye gaze direction (e.g., based on eye angle to the device, eye distance to the device) from the eye gaze information collected or captured. Thus, the eye gaze direction may reveal the screen location of displayed text that includes the event of interest. In alternative embodiments, the reading event detection module 212 may estimate a location of displayed text associated with the reading event based on other information, such as timing information. For example, if a reader starts reading a new page of a document at time=0 seconds and finishes the page at time=20 seconds, and the reading detection module 212 identifies a reading interruption from time 6-8 seconds, the estimated screen location is the text located approximately one third of the way through the displayed text.

At 416, the reading event detection module 212 may store reading events of interest and their corresponding screen locations. In some embodiments, the reading event detection module 212 may map the screen location to a location within the document (e.g., a page of a standard version). Moreover, the reading event communication module 214 may communicate information about the reading events of interest to a network entity, such as network-accessible devices 302.

FIG. 5 shows an example process 500 in which a network entity receives reading events of interest from devices associated with multiple different readers. The process 500 may be implemented by the components at the network-accessible devices 302 of FIG. 3, or by other devices.

At 502, the reading event aggregation module 312 receives reading events of interests for multiple different documents. For example, multiple different devices, such as computing device 104, may track eye gaze movement for their respective readers of the same document and determine reading events of interests. Each individual device may then communicate the reading events of interest, along with a document identifier and a location within the document, to the reading event aggregation module 312.

At 504, the reading event aggregation module 312 may sort the reading events based on the document identifiers, so that reading events for the same document can be correlated.

At 506, the general population event detection module 314 correlates the reading events associated with the same document.

At 508, the general population event detection module 314 determines locations in the document that are associated with a general population reading event (e.g., a threshold amount of readers experience a reading event at a same location for a same document). As discussed above, an individual user's regular reading pattern may experience an interruption or irregularity due to something other than a problem with the text. However, if multiple different users experience a reading interruption or irregularity at the same location, then there is likely a problem with the text. Accordingly, the correlation models 316 may use a problem detection threshold (e.g., at least 80% of readers experience an interruption at a particular location) or other decision criteria or thresholds to correlate different reading events from multiple users and determine if a general population reading event exists.

At 510, the network-accessible devices 302 may implement corrective actions. For example, the notification module 318 may configure and send a communication to an author or other person responsible for writing, producing, publishing, or distributing the document. The communication may include the document identifier (e.g., document name) and the location in the document where the likely problem occurs.

FIG. 6 shows an example process 600 for providing a user with a recommendation based on a determination of a reading event. The process 600 may be implemented by the computing device 104 and/or the network-accessible devices 302, or by other devices.

At 602, the reading event detection module 212 may determine that a reading event of interest is likely associated with a strong user interest. As discussed above, this determination may be based on the length of a reading pause, or interruption to regular eye gaze movement.

At 604, the reading event detection module 212 may then parse the text at the screen location correlated to the reading event of interest, and analyze the text to determine the context of the user interest (e.g., "The Band will play at the Venue in Seattle on Jan. 1, 2013.").

At 606, the reading event detection module 212 may locate and retrieve a recommendation that is related to the context. In various embodiments, the reading event detection module 212 may communicate with the network-accessible devices 302 or other network entities to locate and retrieve a recommendation. In alternative embodiments, reading event detection module 212 may locate and retrieve a recommendation that is stored locally. The recommendations may include an advertisement, an offer, a coupon, and so forth.

At 608, the reading event detection module 212 may provide the recommendation to the user (e.g., display the recommendation). In various embodiments, the reading event detection module 212 may provide the recommendation to the user while the user is still reading the original document. In alternative embodiments, the reading event detection module 212 may provide the recommendation to the user at a later time after the user has finished reading the original document. In further embodiments, the reading event detection module 212 may provide the recommendation to the user via a communication (e.g., email message, text message, etc.).

The techniques, systems and example process discussed above may be automatically activated when a user logs-in to, or begins using, the computing device 104 for electronic reading purposes. In this sense, the computing device 104 and the eye sensor device 108 can begin to track eye gaze movement and detect reading interruptions without having the users configure or turn on the functionality each time they read a document. Alternatively, the computing device 104 may be configured so that the user has to turn-on the functionality to track eye gaze movement and detect reading interruptions.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
receiving, at a computing device, a user selection of a document;
displaying, on the computing device, displayed text of the document, the displayed text being displayed based at least in part on a first formatted version of the document;
capturing, using one or more front-facing cameras of the computing device, a plurality of images of at least a portion of eyes of a user as the user reads the displayed text of the document;
tracking, based at least in part on an analysis of individual ones of the plurality of captured images, a rate at which a gaze of the eyes moves as the user reads the displayed text of the document;
determining that the rate at which the gaze moves is less than a reading rate of the user;
determining a display screen location that contains a portion of the displayed text based on the determining that the rate at which the gaze moves is less than the reading rate of the user;
associating the display screen location that contains the portion of the displayed text with an identifiable section within a second formatted version of the document that is different than the first formatted version of the document, wherein the identifiable section comprises a page; and
sending, to one or more network-accessible devices, an indication that a reading interruption has occurred at the identifiable section within the second formatted version of the document.

2. The method as recited in claim 1, wherein:
the first formatted version of the document is based at least in part on at least one setting of the computing device comprising at least one of text size, line spacing, text spacing, display screen size, or font type.

3. The method as recited in claim 1, wherein the reading interruption is indicative of at least one of a typographical error, a grammatically incorrect phrase, or a confusing phrase in the portion of the displayed text.

4. The method as recited in claim 1, further comprising accessing a reading model that defines the reading rate for the user based on average movement of the gaze of the user.

5. One or more non-transitory computer-readable media having computer-executable instructions that, when executed by one or more processors, cause the one or more processors to perform operations comprising:
displaying text of a document at a computing device, the text being displayed based at least in part on a first formatted version of the document;
tracking gaze movement of a user while eyes of the user are directed toward the text of the document;
detecting an interruption to the gaze movement;
determining that the interruption to the gaze movement occurs in association with a display screen location that contains a portion of the text;
associating the display screen location that contains the portion of the text with an identifiable section within a second formatted version of the document that is different than the first formatted version of the document, wherein the identifiable section comprises a page of the second formatted version of the document; and
sending, to one or more network-accessible devices, information associated with the identifiable section within the second formatted version of the document.

6. The one or more non-transitory computer-readable media as recited in claim 5, wherein the gaze movement comprises a rate of change in gaze direction of the eyes in relation to the text of the document.

7. The one or more non-transitory computer-readable media as recited in claim 6, wherein the operations further comprise:
accessing reading information that defines a regular rate of change in gaze direction of the eyes of the user; and
comparing the rate of change in gaze direction to the regular rate of change in gaze direction, and wherein the interruption to the gaze movement is detected based at least in part on a determination that the rate of change in gaze direction is a threshold amount less than the regular rate of change in gaze direction.

8. The one or more non-transitory computer-readable media as recited in claim 5, wherein:
the first formatted version of the document is based at least in part on at least one setting of the computing device.

9. The one or more non-transitory computer-readable media as recited in claim 5, wherein the associating considers at least one setting of the computing device, the at least one setting comprising at least one of text size, line spacing, text spacing, display screen size, or a type of font.

10. The one or more non-transitory computer-readable media as recited in claim 5, wherein the interruption to the gaze movement is indicative of at least one of a typographical error, a grammatically incorrect phrase, or a confusing phrase associated with the portion of the text.

11. The one or more non-transitory computer-readable media as recited in claim 5, wherein the interruption to the gaze movement is indicative of a user interest in the portion of the text, and wherein the operations further comprise:
parsing the portion of the text to determine the user interest;
sending the user interest as part of the information associated with the identifiable section; and
receiving a recommendation based at least in part on the user interest.

12. The one or more non-transitory computer-readable media as recited in claim 11, wherein the recommendation is one of an advertisement, an offer, or a coupon.

13. A method comprising:
receiving, at one or more network-accessible devices, information on a plurality of reading events from computing devices associated with a plurality of users reading a document, wherein an individual reading event is indicative of an interruption to eye gaze movement as a user reads text of a first formatted version of the document;
determining, based at least in part on the information, a location within a second formatted version of the document associated with a threshold number of reading events, wherein the second formatted version is different than at least one first formatted version and wherein the location comprises a page; and communicating the location to at least one of:

a first computing device associated with a person that is responsible for writing, producing, or publishing the document; or a second computing device associated with an entity that is responsible for writing, producing, or publishing the document.

14. The method as recited in claim 13, wherein at least some of the plurality of reading events are indicative of at least one of grammatically incorrect text or confusing text in the document, the method further comprising receiving new text of the document that corrects the grammatically incorrect text or the confusing text.

15. The method as recited in claim 13, wherein the interruption to the eye gaze movement occurs when a rate of change in eye gaze direction is a threshold amount less than a regular rate of change in eye gaze direction of a user.

16. The method as recited in claim 15, wherein the regular rate of change in the eye gaze direction is determined based on tracking other eye gaze movement while the user reads other documents.

17. The method as recited in claim 13, wherein the one or more network-accessible devices are associated with an account based entity that distributes the document to the network-accessible devices.

18. A system comprising:

one or more processors;

an eye sensor device; and one or more computer-readable storage media storing computer-executable instructions that, when executed by the one or more processors, cause the one or more processors to:

receive, from the eye sensor device, information related to a gaze direction of eyes of a user as the user reads displayed text of a document in a first formatted version;

determine, based on an analysis of the information related to the gaze direction, a current reading speed of the displayed text;

detect that an irregularity occurs based on a determination that the current reading speed is less than a regular reading speed of the user;

determine that the irregularity is associated with a display screen location that contains a portion of the displayed text; and associate the display screen location that contains the portion of the displayed text with an identifiable section within a second formatted version of the document that is different than the first formatted version of the document, wherein the identifiable section comprises a page.

19. The system as recited in claim 18, wherein the computer-executable instructions further cause the one or more processors to determine the regular reading speed based on tracking the gaze direction of the eyes of the user as the user reads other documents.

20. The system as recited in claim 18, wherein the computer-executable instructions further cause the one or more processors to send information associated with the identifiable section to a network entity.

21. The system as recited in claim 18, wherein the irregularity is indicative of at least one of a typographical error, a grammatically incorrect phrase or sentence, or a confusing phrase or paragraph.

22. The system as recited in claim 18, wherein the irregularity is indicative of a personal interest, and the computer-executable instructions further cause the one or more processors to display a recommendation based at least in part on the personal interest.

23. The system as recited in claim 18, wherein the eye sensor device is a front-facing camera.

24. The system as recited in claim 18, wherein the first formatted version modifies the second formatted version based on at least one user profile setting comprising at least one of a text size, a line spacing, text spacing, or font type.

25. The system as recited in claim 22, wherein the recommendation comprises at least one of an advertisement, an offer, or a coupon.

* * * * *